United States Patent
Kelly et al.

(10) Patent No.: US 7,550,168 B2
(45) Date of Patent: Jun. 23, 2009

(54) SPHERICAL GELLED SIMULATED FRUIT WITH DIMPLES, AND EXTRUSION PROCESS

(75) Inventors: Thomas Reid Kelly, Northants (GB); Bryan Edwin Barwick, Northants (GB); Vijay Arjun Sawant, Northants (GB)

(73) Assignee: FMC Corporation, Philadelphia, PA (US)

( * ) Notice: Subject to any disclaimer, the term of this patent is extended or adjusted under 35 U.S.C. 154(b) by 708 days.

(21) Appl. No.: 10/495,064

(22) PCT Filed: Oct. 31, 2002

(86) PCT No.: PCT/GB02/04941

§ 371 (c)(1),
(2), (4) Date: Dec. 23, 2004

(87) PCT Pub. No.: WO03/037108

PCT Pub. Date: May 8, 2003

(65) Prior Publication Data

US 2005/0102989 A1    May 19, 2005

(30) Foreign Application Priority Data

Oct. 31, 2001    (GB) .................................. 0126153.6

(51) Int. Cl.
*A23P 1/12* (2006.01)
(52) U.S. Cl. ...................... 426/515; 426/104; 426/575; 426/577; 426/516; 426/518
(58) Field of Classification Search ................. 426/104, 426/143, 231, 276, 282, 284, 573, 575, 577, 426/383, 512, 514–518, 803, 389; 99/443 R, 99/443 C; 425/67–70
See application file for complete search history.

(56) References Cited

U.S. PATENT DOCUMENTS

| | | | | |
|---|---|---|---|---|
| 1,419,808 A | * | 6/1922 | Bosshard | 141/284 |
| 2,163,580 A | * | 6/1939 | Bianchi | 99/450.2 |
| 2,238,164 A | * | 4/1941 | Edwards | 426/516 |
| 2,403,547 A | | 7/1946 | Syplie | |
| 3,065,777 A | * | 11/1962 | Allen et al. | 99/537 |
| 3,362,831 A | * | 1/1968 | Szczesniak | 426/104 |

(Continued)

FOREIGN PATENT DOCUMENTS

| | | |
|---|---|---|
| GB | 1369198 | 10/1974 |
| GB | 1428362 | 3/1976 |
| GB | 1564452 | 4/1980 |
| JP | 1085059 | 3/1989 |

*Primary Examiner*—Drew E Becker
(74) *Attorney, Agent, or Firm*—Stout, Uxa, Buyan & Mullins, LLP; Frank J. Uxa; Carlos A. Fisher

(57) ABSTRACT

The invention provides fruit-like products based on alginate or low-methoxy pectate gel which are spherical with two dimples spaced at opposite extremes of the sphere. These are prepared by extruding a sol through a cylindrical nozzle and at the same time extruding a gelling agent through a tube centrally located in the nozzle and co-terminous with it. The extrudate is cut off at the end of the nozzle below the surface of a bath of the gelling agent. The extrudate is allowed to gel by diffusion of calcium ions. The gelling agent is an aqueous solution containing calcium ions. The sol, which is an aqueous alginate or low-methoxy pectate sol, preferably contains dispersed fruit puree. Preferably the solution in the bath has a lower density than the density of the sol. In a preferred form of the invention equipment is used comprising a nozzle, a centrally spaced tube, a gelling bath and a perforated support surface in the bath for the gelling product.

23 Claims, 3 Drawing Sheets

U.S. PATENT DOCUMENTS

| | | | |
|---|---|---|---|
| 3,682,654 A * | 8/1972 | Johnson | 426/89 |
| 3,892,870 A * | 7/1975 | Wood | 426/573 |
| 3,922,360 A * | 11/1975 | Sneath | 426/573 |
| 3,968,818 A * | 7/1976 | Gerrans | 141/78 |
| 4,045,879 A * | 9/1977 | Witte | 34/401 |
| 4,117,172 A * | 9/1978 | Bradshaw et al. | 426/276 |
| 4,119,739 A * | 10/1978 | Barwick et al. | 426/573 |
| 4,163,805 A * | 8/1979 | Mueller | 426/575 |
| 4,362,748 A | 12/1982 | Cox | |
| 4,695,466 A * | 9/1987 | Morishita et al. | 424/456 |
| 4,713,252 A * | 12/1987 | Ismail | 426/290 |
| 5,226,972 A * | 7/1993 | Bell | 134/25.1 |
| 5,783,241 A | 7/1998 | Bocabeille et al. | |
| 6,159,518 A * | 12/2000 | Wilson | 426/502 |
| 6,194,015 B1 * | 2/2001 | Garrett | 426/392 |
| 2007/0227368 A1 * | 10/2007 | Lapman et al. | 99/451 |

* cited by examiner

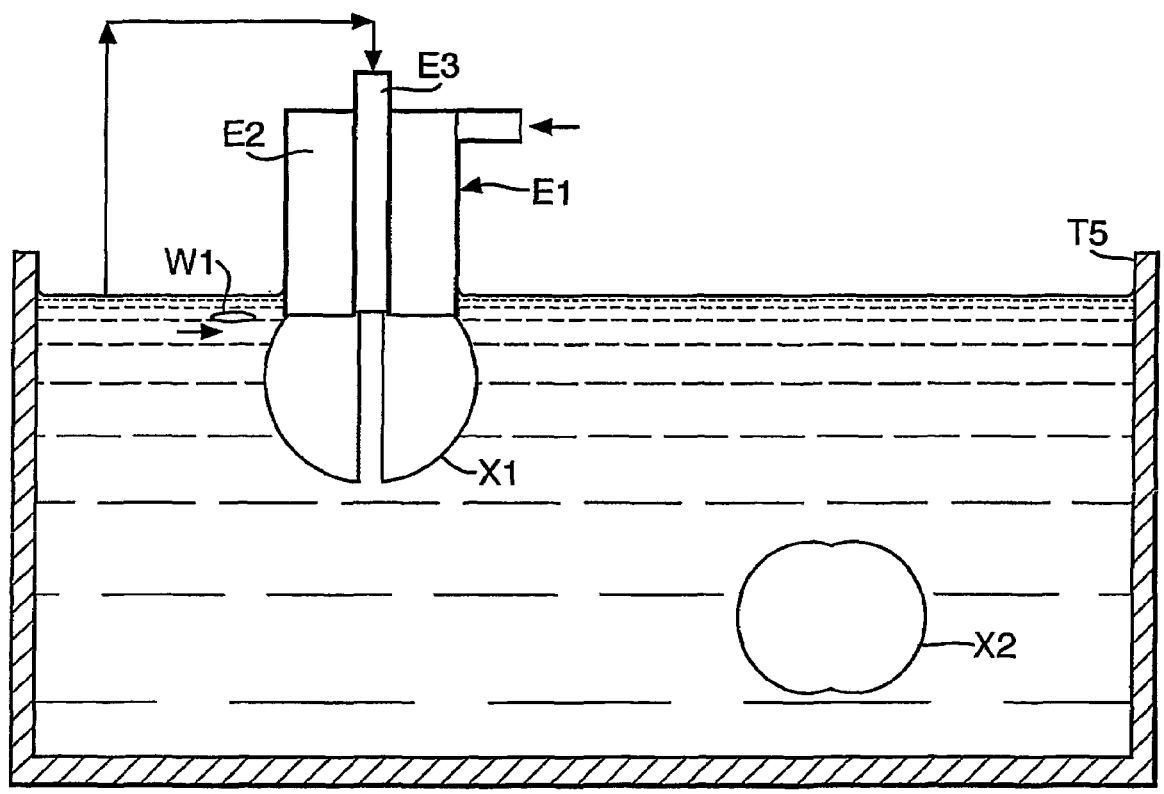

SPHERICAL GELLED SIMULATED FRUIT WITH DIMPLES, AND EXTRUSION PROCESS

BASIS OF THE INVENTION

Alginate and low-methoxy pectate have been used to prepare regular e.g. rectangular or spherical shapes or moulded shapes.

We have appreciated that spherical products based on alginate or low-methoxy pectate gel which have two dimples spaced at opposite extremes of each of the spheres a) resemble natural products, in particular fruits such as cherries, and b) that, although they can be made by moulding techniques, they have the advantage that they can also be made by extrusion techniques. Fruits like cherries have stem cavities where they were connected to their stalks and they quite often have similar features at the opposite side where the original flower was. The dimples simulate the appearance of stem cavities. Our invention therefore provides improved fruit-like products based on alginate or low-methoxy pectate gel which products are spherical with two dimples spaced at opposite extremes of the sphere.

SUMMARY OF THE INVENTION

Processes have been described in which an aqueous alginate or low-methoxy pectate sol incorporating dispersed fruit puree is treated with an aqueous solution containing dissolved calcium ions to allow the calcium ions to diffuse into the sol thereby gelling it. For instance, to prepare small simulated fruits. e.g. cherries or berry fruits, spherical portions of the sol containing dispersed fruit puree are contacted with the aqueous solution containing calcium ions.

A further major aspect of our invention lies in our process for preparing our fruit-like spherical products with two dimples spaced at opposite extremes of the spheres, in which process aqueous alginate or low-methoxy pectate sol is extruded through a cylindrical nozzle whilst extruding an aqueous solution containing calcium ions through a tube centrally located in the nozzle and co-terminous with the nozzle and cutting off the extrudate at the nozzle below the surface of a bath of an aqueous solution containing calcium ions and allowing the extruded product to gel by diffusion of calcium ions into the sol.

From observation we believe that the portions initially are toroidal because of the aqueous solution containing calcium ions that has been fed through the centrally located core tube, but that this structure quickly collapses to a weakened core and finally to permanent depressions at opposing points on the product i.e. dimples resembling stem cavities. But what is certain is that such dimples are readily formed, whatever the precise forms the extruded portions go through between extrusion and final product.

To prepare products closely resembling natural fruits the alginate or low-methoxy pectate sol should preferably contain dispersed fruit puree. But although our invention is particularly directed to preparing such dimpled products based on fruit material, e.g. fruit puree i.e. products resembling natural fruit products, our invention can also be used to prepare dimpled products based on other material. For instance, vegetable puree or minced or pureed meat can be used instead of fruit material.

Equipment suitable for use in our process comprises an extrusion nozzle having a core tube located in the nozzle and co-terminous with the nozzle, a feed for an aqueous solution containing calcium ions connected to the core tube and a feed for alginate or low-methoxy pectate sol connected to the nozzle but not to the core tube, means for cutting material fed through said tubes and a bath for a solution containing dissolved calcium ions positioned to receive product when such materials are fed through said nozzle and said tube.

As mentioned our process is especially useful in the preparation of simulated fruit and, for this purpose, the alginate or low-methoxy pectate sol can conveniently contain dispersed fruit puree. Our process is particularly advantageous when the sol has a relatively high sugar content. The sugar content is advantageously at least 10% and particularly preferably above 50%. A normal practical upper limit is 85%. We have also found that it is advantageous for fructose to be the predominant sugar i.e. forms more than 50% of the total sugars present. Preferably pure fructose is the only added sugar but, although not as preferred, the fructose can be in mixture with other sugars e.g. as in fructose syrups.

Calcium lactate is preferred as the source of calcium ions, particularly for food products, but other soluble calcium salts can be used e.g. calcium chloride, calcium acetate monohydrate, monocalcium phosphate monohydrate, monocalcium phosphate anhydrous and calcium gluconate.

Aqueous alginate sol is the preferred sol. When low-methoxy pectate is used it should preferably contain less than 30% methoxylated hydroxyl groups. "Low methoxy pectate" is a well-known term. The normal dividing line between low-methoxy pectate (or pectin) and high-methoxy pectate (or pectin) is 50% methoxylated hydroxyl groups. The alginate or low-methoxy pectate sol will usually be in the form of its sodium salt but potassium or ammonium salts can be used.

Our process can be used to produce products of a wide range of sizes. They can have diameters for instance as low as 5 mm and as high as 30 mm. 25 mm is a preferred maximum diameter and 8 mm is a preferred minimum. It is relatively simple to determine appropriate extrusion rates and cutting rates for a given size of nozzle to produce a given size of product. The diameter of the nozzle and the time in the bath have to be altered appropriately for larger or smaller products.

In such methods of preparing alginate or low-methoxy pectate based products it is important to ensure that the products do not become distorted. This is normally achieved by adjusting the density of the aqueous solution containing calcium ions to ensure that the portions of alginate or low-methoxy pectate sol just float in the bath. This avoids distortion of the products by contact with the base of the bath or even from contact with the surface of the bath.

In general our fruit-like spherical products with two dimples at opposite extremes of the sphere can be made readily by our process over a wide range of conditions. But we have also found that when preparing high density products, e.g. high sugar products, adjusting the density of the bath containing calcium ions so that the portions of alginate or low-methoxy pectate sol just float leads to unacceptably slow gelation of the sol.

We have found that for such high density products improved gelation can be achieved by using a perforated and oscillated support surface in the bath and with relatively low density aqueous solutions containing calcium ions. This provides a process in which portions of alginate or low-methoxy pectate sol are treated with an aqueous solution containing dissolved calcium ions in a bath so that the calcium ions diffuse into the sol thereby gelling it to form portions of alginate or low-methoxy pectate gel in which the aqueous solution containing dissolved calcium ions has a lower density than the density of the sol and the bath contains a perforated support surface plate to catch the descending incipiently-gelling portions of alginate or low-methoxy pectate sol which perforated support surface is oscillated.

Using this process the time for adequate surface setting of the portions of sol can be reduced from hours to a few minutes. Also the process enables achievement of tightly controlled residence times of the portions of alginate or low-methoxy pectate sol in the aqueous solution containing calcium ions.

Our invention lies also in providing equipment suitable for use in the preparation of our gelled alginate or low-methoxy pectate products comprising an extrusion nozzle having a core tube located in the nozzle and co-terminous with the nozzle, a feed for an aqueous solution containing calcium ions connected to the core tube and a feed for alginate or low-methoxy pectate sol connected to the nozzle but not to the core tube, means for cutting material fed through said tubes and a bath for a solution containing dissolved calcium ions positioned to receive product when such materials are fed through said nozzle and said tube.

As explained above, use of a perforated support surface for the products and oscillating means to oscillate the support surface is advantageous.

An especially preferred aspect of our invention is the use of a perforated and oscillated support surface when the alginate or low-methoxy pectate sol has a density at least 0.002 g/ml greater than that of the aqueous solution containing dissolved calcium ions. The process is particularly important for sols which have a density of about 1.3 g/ml. For such sols it remains optimal for the density of the aqueous solution not to be greater than e.g. the density of a saturated aqueous solution of calcium lactate. It is unlikely that sols will be used which have densities higher than 1.5 g/ml but if they were, then there would still be no significant benefit in increasing the density of the aqueous solution containing dissolved calcium ions. References to densities are to densities at the relevant temperature in the process.

The support surface can be oscillated vertically or horizontally. Vertical oscillation is particularly significant and can work alone e.g. if the aqueous solution containing dissolved calcium ions flows over the support surface towards the transport means. But particularly preferably the support surface is oscillated both horizontally and vertically.

In a preferred form of the invention transport means are provided to remove product from the bath, preferably catching the products as they come off the support surface. The transport means are preferably at one end of the support surface.

In a particularly preferred form of the invention the vertical and horizontal oscillations of the support surface are synchronised. With such synchronised oscillation it is especially advantageous to ensure that, at the beginning of the upward movement of the vertical oscillation, the horizontal oscillation is in the direction of the transport means. The synchronised vertical and horizontal oscillations cause the support surface to move at an angle to the vertical. It is reasonably easy to achieve appropriate throughputs of the products by adjusting the angle and the frequency and length of the oscillations. In a specially preferred form of the invention the rear end of the support surface oscillates vertically over a shorter distance than the front end of the support surface. ("Rear" and "front" are in relation to the position of the transport means.) The movement of the front and rear ends of the support surface are preferably such that the front end reaches its lowest point just after the rear end reaches its lowest point. The support surface is preferably horizontal at its lowest point. It should be noted that a sloped but not oscillated support surface is ineffective.

The dimensions of the perforations in the support surface of course have to be such as to prevent the product falling through. The perforations are preferably such as to fluidise the incipiently gelling portions of alginate or low-methoxy pectate sol particularly when the support surface is oscillated vertically. Conveniently the perforations are circular.

We have also found that the perforated and oscillated support surface is preferably never less than 5 cms below the surface of the bath during the process i.e. even at its highest point when oscillated vertically. It should be noted that a very significant advantage of our invention is that our oscillated and perforated support surface can be as close to the surface of the bath as this or even closer. This is despite the products only being incipiently gelling. A normal surface would have to be more than 40 cms below the surface of the bath. In our process there is little point in having the support surface more than 30 cms below the surface of the bath as the greater the distance below the surface of the bath the larger the bath has to be with consequent larger quantities of bath liquor etc.

To minimise disadvantages of too long immersion, e.g. loss of solids from the product into the bath liquor and diffusion of water into the products, we prefer to have the support surface not more than 20 cms below the surface of the bath. Raising the bath temperature to above 30° C. e.g. 45° C. helps. It is advantageous for it to be not more than 5 cms below the surface of the bath. The support surface should be at least 5 cms below the extrusion nozzle.

The products are preferably stored in a support matrix which has a balanced density to ensure the product is not deformed whilst it is firming up by diffusion of calcium ions into the core of the product.

As explained above, the diameter of the nozzle and the time in the bath have to be altered appropriately for larger or smaller products. Using a perforated and oscillating support surface, for instance, 1 minute in the bath is ample for products, like simulated blueberries, with a diameter of 7 mm and 12 minutes can be necessary for products, like cherries, with a diameter of 25 mm. (Note that in comparison with earlier processes our preferred process using such a support surface can achieve shorter residence times and very consistent residence times. It is particularly suited for continuous operation.)

Suitable equipment constructed in accordance with the invention and a suitable process in accordance with the invention will now be described in greater detail, by way of example only, with reference to the accompanying drawings.

BRIEF DESCRITION OF THR DRAWINGS

FIG. 4 is a more-detailed cross-section of the extrusion head in operation.

DETAILED DESCRIPTION OF THE INVENTION

Figure 1:
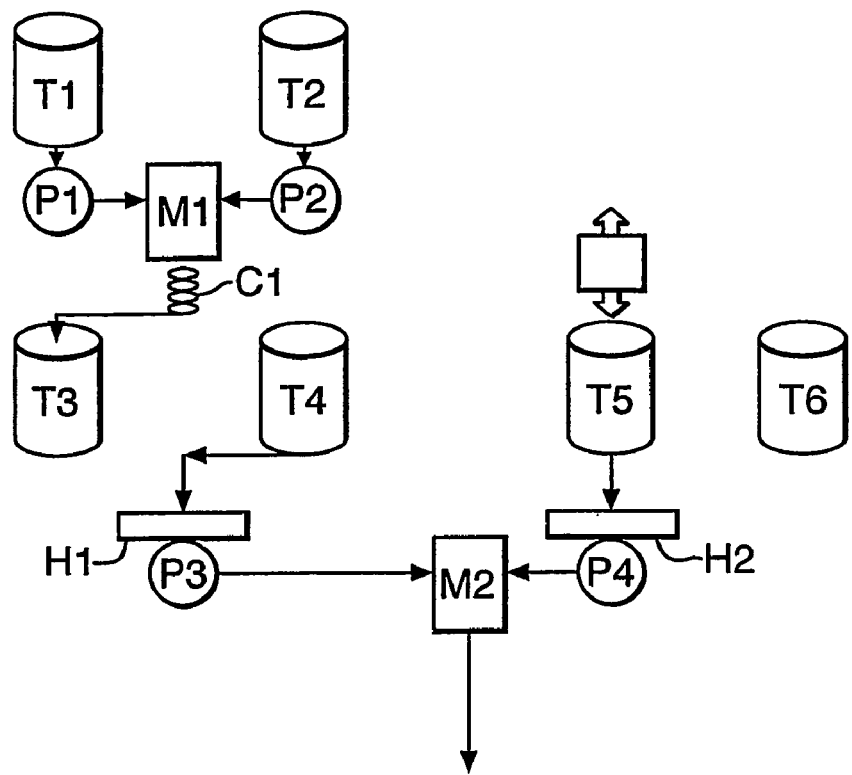
FIG. 1 is a flow-chart of the process and equipment prior to extrusion.

Referring to FIG. 1:

Sodium alginate (Manugel DMB trade mark of ISP Alginates and obtainable from ISP (Alginates) UK) was slurried in glycerol by adding the alginate to the glycerol whilst gently stirring. The slurry was metered from tank T1 by pump P1 to a mixer M1. High-fructose syrup was metered from tank T2 by pump P2 also to mixer M1 which dispersed the alginate in the syrup. The syrup/alginate (see formulation) was passed down a coil C1 to a tank T4 where it was stored for at least 4 hours, typically overnight to allow complete hydration of the alginate. To ensure a supply of fully hydrated alginate sol it is sensible to have two tanks i.e. tanks T3 and T4 are used alternately.

The syrup/alginate, an aqueous alginate sol with a high fructose content, produced the previous day and held in tank T4, was then pumped by pump P3 via a hopper H1 with an auger to mixer M2 (a dynamic in-line mixer e.g. a Mini Mondomixer available from Mondomix of the Netherlands).

A cherry mix was prepared from cherry puree and fructose with other minor ingredients (see formulation) and stored in tanks T5 and T6. The cherry mix was metered by pump P4 via a hopper H2 with an auger to mixer M2 to produce an aqueous alginate sol containing dispersed cherry pulp and with a high sugar content and to feed this to an extrusion head shown in FIG. 2.

Figure 2:
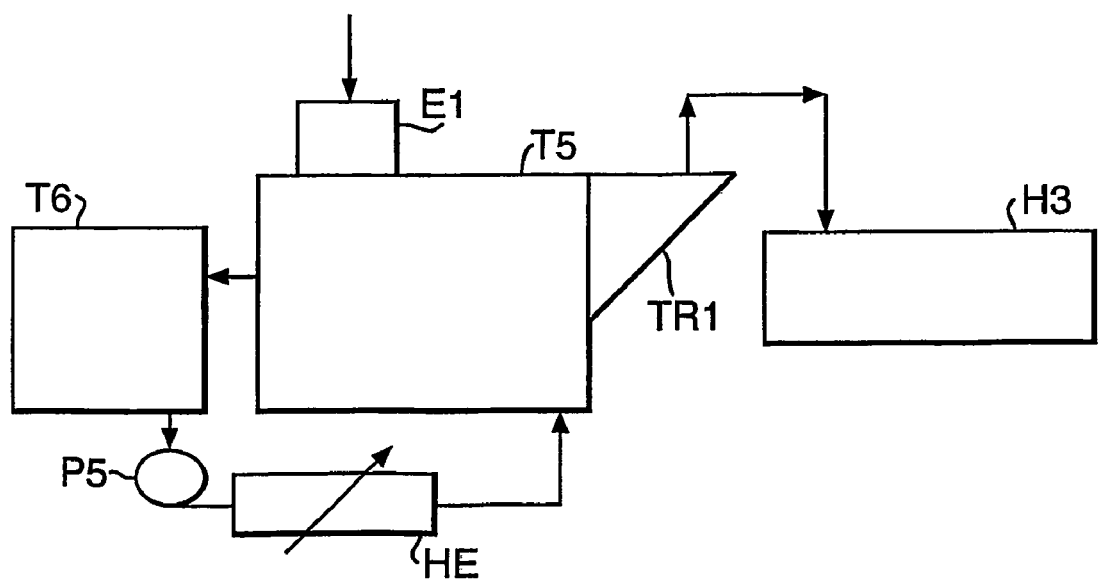
FIG. 2 is a flow-chart of the process and equipment from extrusion to packaging of the product.

Referring to FIG. 2:

The aqueous alginate sol containing dispersed cherry pulp with a high fructose content prepared as described above with reference to FIG. 1 was fed to an extrusion head E1. Tank T5 contained a bath of an aqueous solution of 5% calcium lactate into which the aqueous alginate sol containing dispersed cherry pulp with a high sugar content was extruded. Cherry-sized products with dimples at opposite extremes were formed as described below in connection with FIGS. 3 and 4.

Transporter TR1 transported the products out of the solution of calcium lactate to hopper H3. Before they reached hopper H3 excess calcium lactate solution was blown off them. Hopper H3 contained a support matrix with a balanced density to ensure the product is not deformed whilst it is firming up by diffusion of calcium into the core of the product. The ratio of support matrix to product was about 1:4 when the hopper is adequately full.

The solution of calcium lactate was pumped by pump P5 from a make-up tank T6, then through a heat-exchanger to return to tank T5 from which it flowed over a weir to Tank 6. A muslin bag kept replenished with calcium lactate was suspended in tank T6 to maintain the concentration of the calcium lactate. The density of the solution of calcium lactate was approximately 1.04 g/ml. The solution of calcium lactate was heated in heat exchanger (HE1) to maintain a temperature of 45° C. in tank T5. An advantage of our process is that there is little or no waste material to be removed from the system, after establishment of a balanced process, and it can be used continuously.

Figure 3:
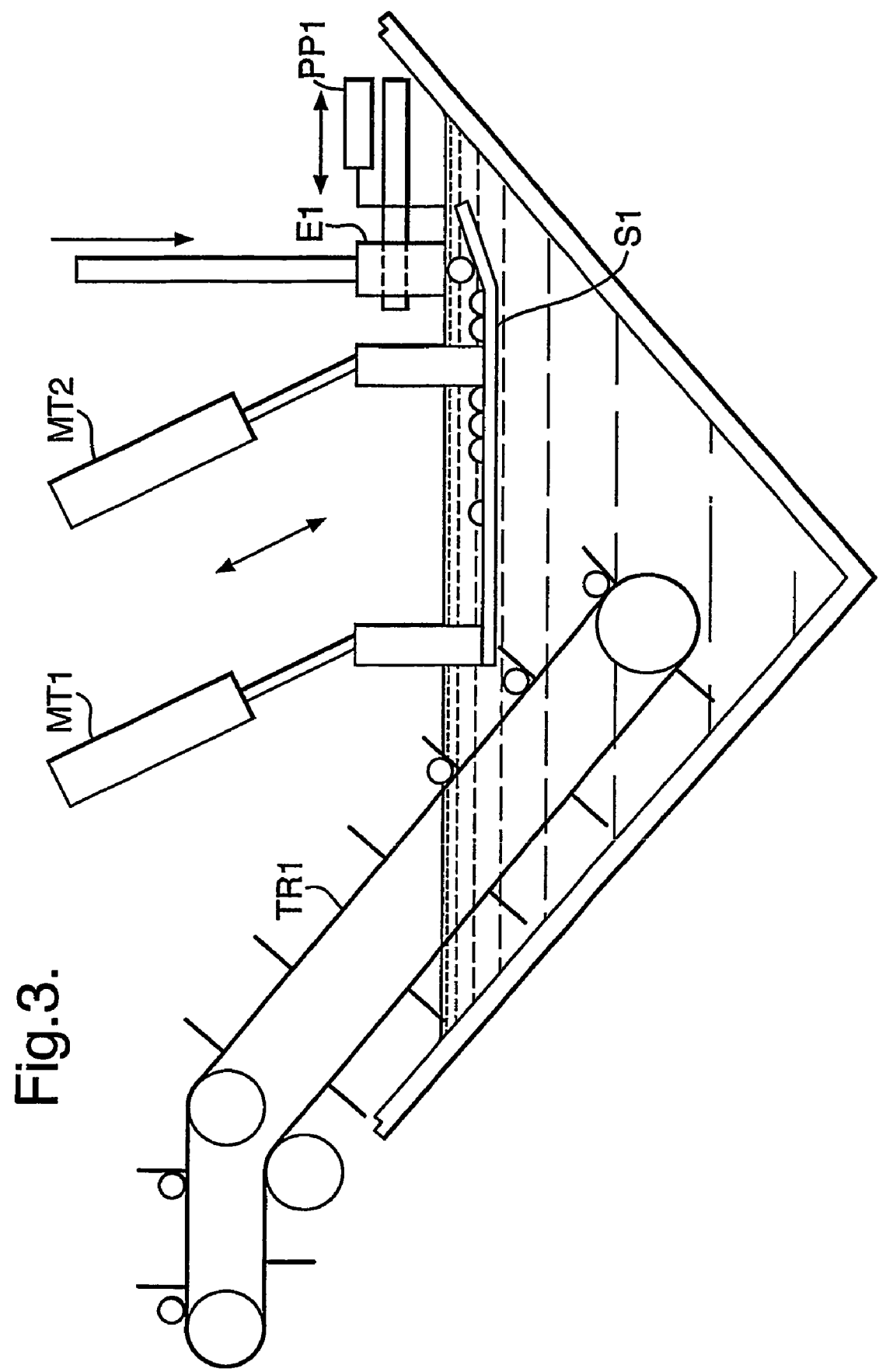
FIG. 3 is a cross-section showing the extrusion head, the bath and the transport mechanism.

Referring to FIG. 3:

Extrusion head E1 and the pneumatic piston PP1 are shown as are an oscillating and perforated support surface S1 and transporter TR1 which conveyed the products. The extrusion head E1 contained a circular extrusion nozzle E2 of diameter 1.5 cm. A core tube E3, shown in FIG. 4, was centrally positioned in the nozzle E2, also shown in FIG. 4. The extrusion head E1 was positioned 2 cms below the surface of the solution of calcium lactate. A 5% solution of calcium lactate was passed down the inner extrusion tube E2. The aqueous alginate sol containing dispersed cherry pulp was extruded down the nozzle E2 round the core tube E3 at 6 cm/sec. A wire W1, shown in FIG. 4, was oscillated across the mouth of E1 by pneumatic piston PP1 to cut the alginate sol into cherry-sized pieces. The wire, W1 was oscillated across the mouth of the nozzle 4 times a second.

Referring to FIG. 4:

This shows the extrusion head E1 with the core tube E3 positioned centrally in the nozzle E2. Diagrammatically it also shows, eg by arrows, the entry point of the alginate sol to the nozzle E2 and the flow of the solution of calcium lactate from the bath in Tank 5 down the core tube E3. X1 is a diagrammatic representation of the immediate extrusion product. X2 shows the product in its final shape.

Returning to FIG. 3, which unlike FIG. 4, shows further details of the equipment used:

The cherry-sized pieces fell gently through the solution of calcium lactate on to an oscillating perforated support surface S1 attaining a cherry-like shape with dimples (see FIG. 4) and were transported out of the solution of calcium lactate on a transporter TR1. Motors (i.e. pneumatic pistons) MT1 and MT2 caused the support surface S1 to oscillate horizontally and vertically, both at a frequency of 15 strokes a minute. The stroke length at the front of the support surface was 3.5 cms. The stroke length at the rear of the support surface was 2.7 cms. The angle from the vertical of the movement of the support surface was 20 degrees. The support surface at the highest point of its vertical oscillation was 4 cms below the extrusion head. The support surface under the extrusion head was angled at 30 degrees to the horizontal. This was to avoid products piling up under the nozzle. The support surface had an array of circular perforations of 3 mm diameter spaced 6 mm apart. The support surface S1 had a low rim to prevent the cherry-sized pieces falling off other than on to the transporter TR1 Details of the ingredients and mixtures used were as follows (percentages are by weight):

|  | % |
|---|---|
| Syrup | |
| Fructose | 32.25 |
| Water | 13.74 |
| Colour | 00.01 |
| Total | 46.00 |
| Alginate slurry | |
| Sodium citrate | 00.20 |
| Sodium alginate | 00.80 |
| Glycerol | 3.00 |
| Total | 4.00 |
| Cherry mix | |
| Candied cherries | 25.00 |
| Citric acid | 1.20 |
| Sodium citrate | 0.40 |
| Fructose | 22.79. |
| Colour | 0.01 |
| Flavour | 0.60 |
| Total | 50.00 |
| Support matrix | |
| Fructose | 75.00 |
| Citric acid | 1.20 |
| Colour | 0.02 |
| Flavour | 0.04 |
| Water | 23.38 |
| Total | 100.00 |

The equipment and process described above is, of course, suitable for use with other compositions based on alginate or low-methoxy pectate sols.

The invention claimed is:

1. A process for preparing fruit-like spherical products with two dimples spaced at opposite extremes of the spheres comprising: extruding an aqueous alginate sol or an aqueous low-methoxy pectate sol through a cylindrical nozzle whilst extruding an aqueous solution containing calcium ions through a tube which tube is centrally located in the cylindrical nozzle and co-terminous with the nozzle to produce an extrudate and cutting off the extrudate using a cutting assembly at the nozzle below the surface of a bath of an aqueous solution containing calcium ions to produce portions of the extrudate and allowing the portions of the extrudate to gel by diffusion of calcium ions into the sol from the bath of an aqueous solution containing calcium ions and from the aqueous solution containing calcium ions extruded through the tube which is centrally located in the cylindrical nozzle, thereby producing a fruit-like spherical gelled product with two dimples spaced at opposite extremes of the spheres.

2. A process according to claim 1 in which the aqueous alginate or low-methoxy pectate sol contains dispersed fruit puree.

3. A process according to claim 1 in which the sol is an aqueous alginate sol.

4. A process according to claim 2 in which the calcium ions are provided by dissolved calcium lactate.

5. A process according to claim 1 in which the aqueous solution in the bath which contains dissolved calcium ions has a lower density than the density of the aqueous alginate sol or the low-methoxy pectate sol and the bath contains an oscillated perforated support surface effective to catch descending incipiently-gelling portions of extrudate.

6. A process according to claim 5 in which the aqueous alginate sol or the aqueous low-methoxy pectate sol has a density at least 0.002 g/ml greater than the density of the aqueous solution containing dissolved calcium ions.

7. A process according to claim 6 in which the density of the aqueous alginate sol or the aqueous low-methoxy pectate sol is at least 1.3 g/ml.

8. A process according to claim 5 in which the oscillated perforated support surface is oscillated vertically.

9. A process according to claim 8 in which the oscillated perforated support surface is also oscillated horizontally.

10. A process according to claim 9 in which the vertical and horizontal oscillations of the oscillated perforated support surface are synchronized.

11. A process according to claim 10 in which the incipiently gelling portions of the aqueous alginate sol or the aqueous low-methoxy pectate are removed from the bath by transport means provided at one end of the support surface.

12. A process according to claim 11 in which when each vertical oscillation begins horizontal oscillation is in the direction of the transport means.

13. A process according to claim 12 in which the rear end of the oscillated perforated support surface furthest from the transport means oscillates vertically over a shorter distance than the end of the support surface nearest the transport means.

14. A process according to claim 13 in which the vertical oscillation of the oscillated perforated support surface is synchronized so that the end of the support surface nearest the transport means reaches its lowest point just after the end of the oscillated perforated support surface furthest from the transport means reaches its lowest point.

15. A process according to claim 14 in which the vertical oscillation of the oscillated perforated support surface is synchronized so that the oscillated perforated support surface is horizontal when at its lowest point.

16. A process according to claim 15 in which the oscillated perforated support surface is not less than 5cms below the surface in the bath of the aqueous solution containing dissolved calcium ions.

17. A process according to claim 16 in which the oscillated perforated support surface is not more than 30cms below the surface in the bath of the aqueous solution containing dissolved calcium ions.

18. A process according to claim 17 in which the oscillated perforated support surface is not more than 20cms below the surface in the bath of the aqueous solution containing dissolved calcium ions.

19. A process according to claim 1 in which in the aqueous alginate sol or the aqueous low-methoxy pectate sol there is more than 10% of sugar.

20. A process according to claim 19 in which in the sugar fructose forms more than 50% of the total sugars present in the aqueous alginate sol or the aqueous low-methoxy pectate sol.

21. A process according to claim 20 in which fructose is the only added sugar.

22. A process according to claim 5 further comprising storing the incipiently-gelling portions of extrudate in a support matrix having a balanced density to ensure the incipiently-gelling portions of extrudate are not deformed while firming up by diffusion of calcium into the portions.

23. A continuous process according to claim 5.

* * * * *